J. P. SHANNON.
FISH LURE.
APPLICATION FILED NOV. 15, 1916.

1,295,617.

Patented Feb. 25, 1919.

Witnesses:
Robert H. Weir
Arthur W. Carlson

Inventor
Jesse P. Shannon

James R. Offield Atty

UNITED STATES PATENT OFFICE.

JESSE P. SHANNON, OF LAKE GENEVA, WISCONSIN.

FISH-LURE.

1,295,617.  Specification of Letters Patent.  Patented Feb. 25, 1919.

Application filed November 15, 1916. Serial No. 131,380.

*To all whom it may concern:*

Be it known that I, JESSE P. SHANNON, a citizen of the United States, residing in the town of Lake Geneva, county of Walworth, State of Wisconsin, have invented certain new and useful Improvements in Fish-Lures, of which the following is a specification.

My invention relates to a fish lure that may be used either with or without a natural or artificial bait and for either casting or trolling.

The principal object of the invention is to construct a lure that will be effective for attracting fish to it and with its hook or hooks so arranged relative to the moving lures or spoons, that the hooking of fish is more positive and certain than heretofore.

A further object of the invention is to construct a weedless spoon lure with the hook so protected that there is little liability of the hook becoming caught in weeds or snags when either casting or trolling.

These objects I accomplish by mounting the lure or spoon upon one or more resilient arms that are secured to the shank of the hook and which are so formed, positioned and proportioned relative to the point or barbed end of the hook that the point of the hook lies behind and below the free end or ends of the arms. The lures or spoons which are swivelly mounted on the free ends of the arms are spaced apart so as to be upon opposite sides of the hook end and extend rearwardly to overlie the pointed end of the hook and thus conceal it. While a weight is preferably employed it may be omitted, but when used it is positioned near the eye end of the shank so that when either casting or trolling, if the lure sinks, the eye end of the shank travels foremost and thus the spoons will at all times operate.

Other objects and advantages will appear in the further description of the invention which is clearly illustrated in the accompanying drawing, in which—

Figure 1:
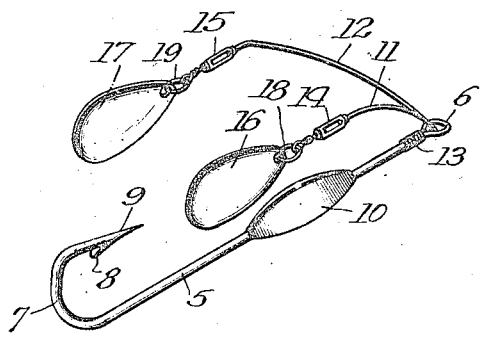
Figure 1 is a perspective view of my improved fish lure.
Figure 2:
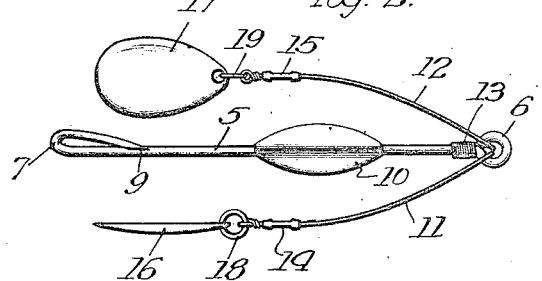
Fig. 2 is a top plan view of Fig. 1.

Referring now more particularly to the drawing, the hook employed is of the usual character herein shown as comprising a shank 5 having an eye 6 formed at one end and a hook end 7 that is provided with the usual barb 8 near the sharp or pointed end 9. A weight 10 may be secured to the shank 5 and preferably nearer the eye 6 than the hook end 7 so as to cause the eye end to travel foremost as in the case of the sinking of the hook. Secured to the shank of the hook at or near the eye end are one or more resilient arms or guards 11 and 12 that may be either formed of a single piece of resilient material bent upon itself, or of two pieces, and the method of attachment may be by binding the resilient material to the shank with wire 13, or any other suitable method, such as by soldering.

The spring arms or guards 11 and 12 are herein shown as composed of wire that is relatively stiff so as not to be too resilient and thus not effectively function as guards. The arms extend upwardly and rearwardly from the eye end of the shank and preferably have their free ends bent to lie above the pointed end of the hook and substantially parallel with the shank for a short distance so that weeds will more effectively slide over and off of their free ends. Swivels 14 and 15 are preferably secured to the free ends of said arms 11 and 12 respectively and to the swivels are secured lures or spoons 16 and 17. The means for securing the spoons to the swivels is herein shown as split rings 18 and 19.

It is to be noted that the arms and spoons must be so proportioned as to bring the rear or free ends of the spoons immediately adjacent the pointed end 9 of the hook so that the lures partially conceal the hook end and the fish in striking the lure will become engaged by the hook.

Figure 3:
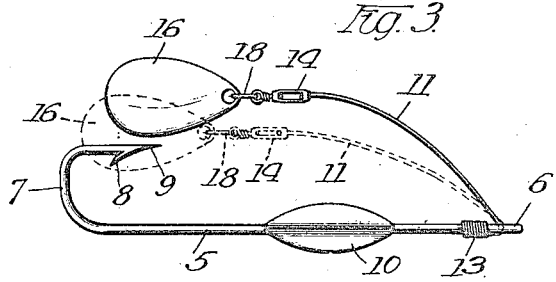
Fig. 3 is a side elevational view of Fig. 2, showing one of the spring arms in the position which it assumes due to the resistance of the water.
Figure 4:
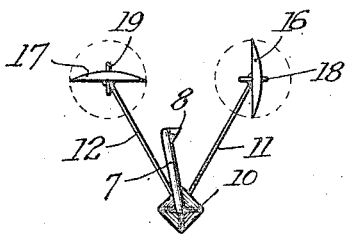
Fig. 4 is an end view of Fig. 2.

When the lure is being drawn through the water at the average speed for proper functioning the resistance of the water will cause the spring arms to yield slightly and the arms and spoons will assume the position shown in the dotted lines of Fig. 3. Thus the hook is more effectively concealed and when the spoon is struck by the fish it stops spinning thereby reducing the resistance and the arm will spring back to normal. There is no liability of the spoon in its lower position preventing the fish from becoming engaged by the hook, for the point of the hook is always below the longitudinal center of the spoon. In addition to the arms functioning as guards they also serve to increase the oscillatory movement of the spoons giving a shimmering or vibratory effect that is very desirable.

It will of course be understood that a single arm construction may be employed and the two arms and spoons are not necessary although desirable.

Having now described my invention, I claim:

1. A fish lure comprising a fish hook consisting of a shank, a hook end and means for attaching the same to a line, in combination with a resilient arm secured to said shank adjacent one end and extending toward said hook end, a spoon lure swivelly connected at one end only to the free end of said arm, said lure being of sufficient length to overlie the end of said hook.

2. A fish lure comprising a fish hook consisting of a shank, a hook end and means for attaching the same to a line, in combination with a resilient arm secured to said shank adjacent one end and a spoon lure swivelly connected at one end only to the free end of said arm and offset from said shank.

In witness whereof I hereunto subscribe my name this 9th day of November, A. D. 1916.

JESSE P. SHANNON.